United States Patent [19]

Dick

[11] 4,425,814
[45] Jan. 17, 1984

[54] TORQUE LIMITING DEVICE

[75] Inventor: Wesley M. Dick, Ft. Wayne, Ind.

[73] Assignee: Dana Corporation, Toledo, Ohio

[21] Appl. No.: 246,536

[22] Filed: Mar. 23, 1981

[51] Int. Cl.³ ............................................. F16H 25/20
[52] U.S. Cl. .............................. 74/89.15; 74/424.8 R; 74/470; 192/141; 192/109 A
[58] Field of Search ............... 74/89.15, 424.8 R, 470; 192/109 A, 141, 143

[56] References Cited

U.S. PATENT DOCUMENTS

| | | | |
|---|---|---|---|
| 1,760,063 | 5/1930 | Hynes . | |
| 2,417,434 | 3/1947 | Mead et al. | 192/143 |
| 2,594,891 | 4/1952 | Embree | 74/470 |
| 2,620,911 | 12/1952 | Krell | 192/141 |
| 3,216,278 | 11/1965 | Plume | 74/625 |
| 3,319,481 | 5/1967 | Goodman | 74/424.8 R |
| 3,326,054 | 6/1967 | Canick et al. | 192/141 |
| 3,669,476 | 6/1972 | Wilson | 192/109 A |
| 4,064,981 | 12/1977 | House et al. | 74/424.8 R |

FOREIGN PATENT DOCUMENTS 94727  6/1920  Switzerland .................. 74/424.8 R Primary Examiner—Lawrence J. Staab
Attorney, Agent, or Firm—Frank B. McDonald

[57] ABSTRACT

A speed change mechanism, which includes a housing enclosing a travelling nut on a rotatable screw shaft, incorporates a device for limiting torsional impact loads on the shaft. In a preferred embodiment, the torque limiting device is comprised of two groups of annular members at each end of the shaft for frictionally absorbing impact loads created by sudden stoppage of the nut at respective ends of the shaft. Each group is comprised of at least one friction disc rotatably fixed but axially slidable with respect to the nut, and at least one torque reaction member non-rotatable within the housing against which an associated friction disc is urged via spring. Inertial loads created at ends of nut travel are thereby transferred to the housing instead of the screw shaft. In addition, the two groups of annular members cooperate with the spring to provide a pre-load shifter function for the speed change mechanism.

10 Claims, 7 Drawing Figures

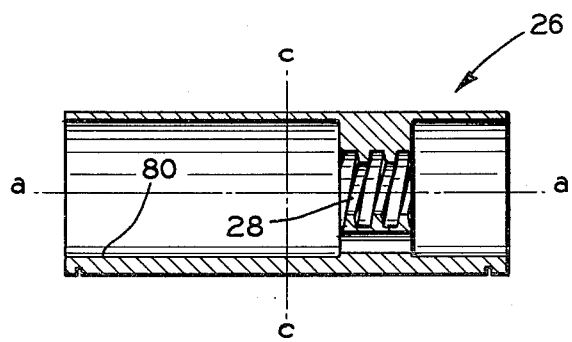
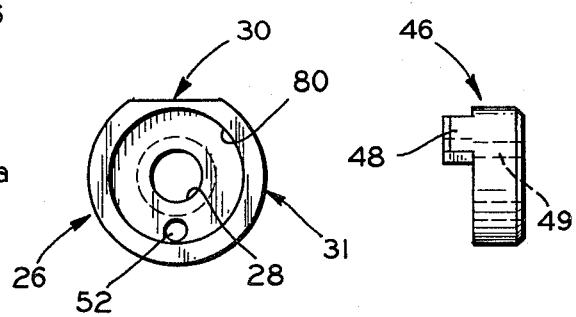
FIG. 2A  FIG. 2B  FIG. 3
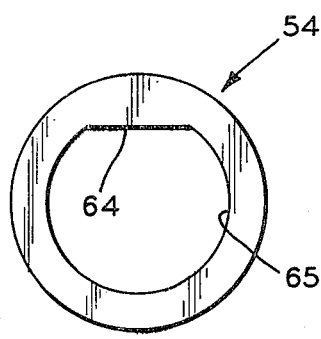
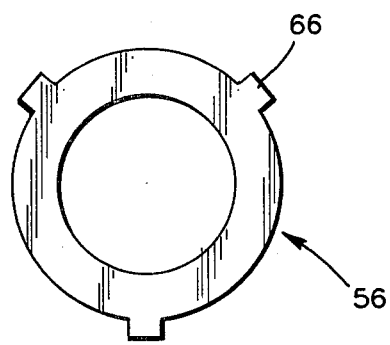
FIG. 4  FIG. 5
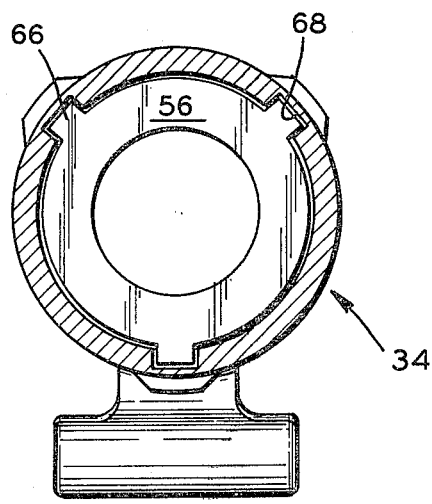
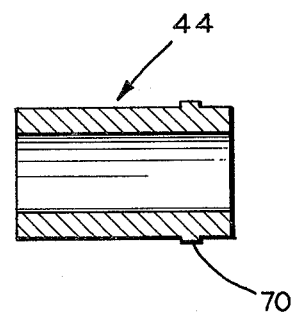
FIG. 6  FIG. 7

TORQUE LIMITING DEVICE

BACKGROUND OF THE INVENTION

This invention relates to speed change mechanisms for changing gear speed ratios between positions selectable by an operator. More particularly, this invention relates to torque limiting devices within speed change mechanisms of the type actuated by a travelling nut on a screw shaft. Screw shafts utilized in such structures have endured high fatigue failure rates as a result of cyclic torque loading of the screw shaft created via nut impact stoppage at the screw ends. Some solutions to the cyclic torque loading problem have been tried, as for example, snubber structures having non-metallic resilient thrust absorbing means as disclosed in U.S. Pat. Nos. 2,398,841 and 2,424,492, both to Morris. These, however, have suffered short-life problems. The rubber or "neoprene" deformable elements as utilized become crazed and hardened after successive impacts, and are thus susceptible to early failure. U.S. Pat. No. 2,738,685 to Hartz discloses the use of a helical spring to absorb shock at the ends of nut travel along a screw by unwinding the spring to expand same into frictional sliding engagement with the inner surface of a torque tube.

SUMMARY OF THE INVENTION

The torque limiting device of this invention is suitable for incorporation in a speed change mechanism. The device is reliable, of simple construction, and is not limited to non-metallic deformable materials, which are subject to crazing and consequent brittleness failures under conditions of cyclic loading.

In a preferred embodiment, two groups of annular members surroundingly engage the nut, one group at each end of the nut, the groups being urged apart by a spring. Each group includes at least one friction disc axially slidable over, but non-rotatable relative to the nut, and at least one torque reaction member urged against the friction disc via the spring, the reaction member being non-rotatable relative to the housing of the speed change mechanism. The respective torque reaction members slide axially in keyways of an annular shifter slide which encases the nut and screw assembly. The shifter slide contains a shifter fork engaging member disposed for moving a shifter fork between two positions which correspond to nut stop positions at the ends of the shaft. The two groups of annular members and spring not only provide a torque limiting feature but also operate to perform a shift pre-load function by storing spring energy between shifts by a vehicle operator.

BRIEF DESCRIPTION OF THE DRAWINGS

FIGS. 2A and 2B are cross-sectional side and end views respectively of a nut utilized in the speed change mechanism of FIG. 1.

FIG. 3 is a side view of a shifter nut stop as affixed to respective ends of a screw shaft of the speed change mechanism of FIG. 1.

FIG. 4 is a face view of an annular friction disc as incorporated in a preferred embodiment of the torque limiting device of this invention.

FIG. 5 is a face view of an annular torque reaction member as employed in the same embodiment.

FIG. 6 is a cross-sectional view of a shifter slide as incorporated in the speed change mechanism of FIG. 1, which depicts axial slots therein for receipt of sliding tabs of the reaction member of FIG. 5. FIG. 6 is taken along lines 6—6 of FIG. 1.

FIG. 7 is a cross-sectional view of a shaft bushing incorporated in the speed change mechanism of FIG. 1.

DETAILED DESCRIPTION OF A PREFERRED EMBODIMENT

Figure 1:
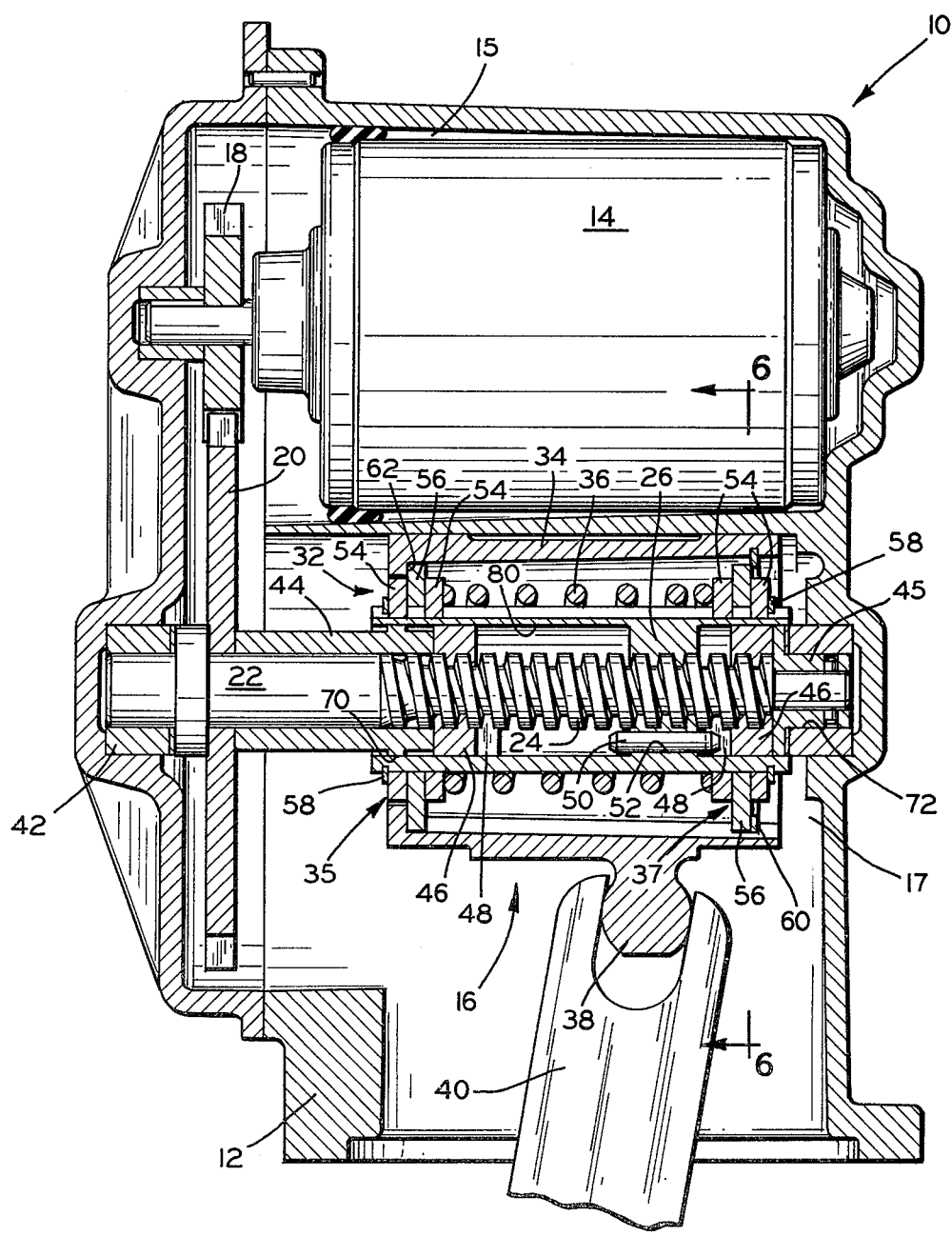
FIG. 1 is a cross-sectional and side view of a speed change mechanism which incorporates the torque limiting device of this invention.

A preferred embodiment of the torque limiting device of this invention is described as utilized in a speed change mechanism 10 in FIG. 1. The mechanism 10 is a two speed axle shifter which embodies a housing 12 containing both prime mover and shifter hardware. Thus, an electric reversible motor 14 is contained within a separate hermetically sealed upper compartment 15 of the housing 12, while the actual physical shifter mechanism 16 is contained within a lower compartment 17, as shown. The reversible motor 14 rotates a motor drive gear 18 in constant mesh with a shifter driven gear 20. The shifter driven gear 20 is in turn fixed to a screw shaft 22, whereby the shaft 22 may be rotated in either direction via the reversible motor 14.

Rotation of the screw shaft 22 results in left- or right-hand directed movement of a drive nut 26 over a threaded portion 24 of the shaft 22 (FIG. 1). The nut 26 has a corresponding internally threaded portion 28 (FIG. 2) which engages the threads of the threaded portion 24 for cyclic movement thereover as required during operation of the shifter. At each end of the threaded portion 24 of the shaft 22 is a shifter nut stop 46 (FIG. 3) which also contains an internally threaded portion to provide for its engagement with an end of the threaded portion 24. The nut stops 46 contain impact lugs 48 and rotate with the shaft 22, while the drive nut 26 is frictionally restrained from rotation except during stoppage thereof at respective ends of the threaded portion 24 of the shaft 22, as explained hereinbelow. Stoppage of linear progression of the nut along the shaft 22 is induced by the impact of the rotating impact lugs 48 against a roll pin 50 axially disposed within a bore 52 (FIG. 2B) of the nut 26. The impact lugs 48 comprise an integral surface of the nut stops 46 for making striking contact against the pin 50. It will be seen (FIG. 1) that the roll pin 50 extends from both ends of the bore 52; thus the left and right ends of the pin 50 contact the left and right impact lugs 48 of nut stops 46, respectively. The ends of the shaft 22 are supported in left and right hand bushings 44 and 45. Both bushings 44 and 45 rotate with the shaft 22.

The right hand bushing 45 is axially of relatively short dimension, and is preferably of a nylon or equivalent material for long wear characteristics. The left hand bushing 44 is relatively long in its axial dimension, and referring momentarily to FIG. 7, has a raised annulus 70 about its circumference. The annulus 70 provides a bearing surface for the internal wall 80 (FIG. 2B) of the outer body of the nut 26. As the nut 26 in the preferred embodiment has its internally threaded portion 28 (FIG. 2A) asymmetrically located along the internal radial axis a-a thereof (positioned to the right of the axial or longitudinal center c-c of the nut as shown), a bearing surface in addition to portion 28 is suggested for proper support of the nut. The annulus 70 provides such support between the internal wall 80 of the nut 26 and bushing 44. As the nut 26 is shown in extreme rightward position in FIG. 1, it will be seen that the internal wall 80 of the nut 26 will be in constant contact with the raised annulus 70. The surface area of the raised annulus 70 is preferably minimized for reduction of friction drag created by viscous shear of oil between the internal wall 80 of the nut 26 and the rotating bushing 44. As use of the annulus 70 gives rise to a substantial improvement in cold weather operation, its use is preferred as means of bearing support within the nut 26, instead of the otherwise full cylindrical outer surface area of the bushing 44.

The torque limiting mechanism of this invention is shown generally at 32 in FIG. 1. In operation, the device functions to more gradually transfer rotational inertia of the screw assembly to the shifter housing 12, thus avoiding instantaneous absorption of impact loading by the screw.

The mechanism 32 comprises two groups 35 and 37 of annular members, one group at each end of the nut 26. Each group is comprised of a pair of annular friction discs 54 (FIG. 4) clasping an annular torque reaction member 56 (FIG. 5) positioned interjacent the discs 54. The mechanism 32 also includes a shifter spring 36 (FIG. 1), intermediate the two groups, the spring preferably in constant compression, thus always urging the groups apart.

Snap rings 58 restrain the friction discs 54 from sliding off of the ends of the nut 26. A shifter slide shoulder 62 and a reaction member snap ring 60 provide the same function for respective left and right hand reaction members relative to the ends of the shifter slide 34. Each associated pair of discs 54 slides axially over the annular body of the drive nut 26 (FIG. 2B) but, as result of a flat 30 which interrupts the otherwise external circular periphery 31 thereof, is restrained from rotational movement relative thereto as result of a corresponding flat 64 on the internal nut-engaging circular periphery 65 of each friction disc 54. Although flats 30 and 64 are incorporated in nut and associated friction disc in the preferred embodiment described herein, the use of tangs, splines, or other means of resisting relative rotation could be suitably employed.

Each torque reaction member 56 is axially slidable but non-rotatable with respect to a non-rotatable shifter slide 34, and includes tangs 66 which engage corresponding keyways 68 in the shifter slide 34 (FIG. 6). The internal diameter of each reaction member 56 must be smaller than the external diameter of associated friction discs 54 in order to ensure frictional engagement between the two members.

It may now be appreciated that upon reaching either end of travel along shaft 22, the linear motion of the nut 26 will be abruptly arrested via the striking of the rotating impact lug 48 of the shifter nut stop 46 against the roll pin 50 rigidly affixed to the non-rotating nut 26. The rotational inertial load of the screw shaft and motor gear train assembly will result in momentarily continued rotation, thereby causing the nut 26 to begin rotation therewith. As the shaft 22 rotates, the friction between the respective friction discs 54 and reaction members 56 will ensure that the nut rotates only upon impact of lugs 48 with the roll pin 50. By virtue of the flats 64 and 30 on the friction discs 54 and nut 26, respectively, the friction discs 54 will also begin turning with the nut 26. The inertial forces associated with sudden nut stoppage are thereby frictionally dissipated through the reaction members 56, which thereby provide a high torque braking function. Thus, the inertial load is absorbed through associated reaction members to the shifter slide 34, and ultimately to the housing 12.

It may now also be appreciated that the spring 36 is disposed for performing a shifter pre-load function, in addition to cooperating with the groups 35 and 37 of discs 54 and reaction members 56 to perform the torque limiting function just described. Thus, if gear train torque is sufficiently high, as, for example, when drive train components are under load, any movement of the shifter spring 34 will simply store compression spring energy to enable a desired shift upon subsequent reduction of gear train torque, e.g. upon declutching of an associated vehicle.

Such operation is now described, in which it is desired that the shifter fork engaging member 38 will move the shifter fork 40 leftwardly from the right hand position shown in FIG. 1. To effect a pre-load shift, an operator would energize the motor 14, and via gears 18 and 20, the screw shaft 22 would rotate so as cause the drive nut 26 to be moved to the left. As the drive nut 26 is moved leftwardly, friction between the right hand friction discs 54 and torque reaction member 56 would restrain the nut from rotating on the rotating shaft 22, while right hand snap ring 58 would ensure that the right hand group of discs 54 and member 56 move leftwardly with the nut 26. The spring 36 would thus be compressed against the left hand friction disc 54 (the one in contact with the spring, only) and the left hand torque reaction member 56. The spring force would then be transmitted to the shifter slide 34 via the shoulder 62, against which the left hand reaction member 56 bears. (Alternatively, the reaction member snap ring 60 would be operative to transmit the spring force to the shifter slide 34 were the shifter fork 40 being moved to the right.) Assuming the pre-load shift, as suggested, the shifter slide 34 would not move during movement of the nut 26, but would move at some later moment when the gear train torque is reduced.

Under a non-preload shift, the spring does not store energy, but merely transfers, directly, the motion of the nut 26 to the shifter slide 34. In either case the torque limiting mechanism operates independently of the preload function.

Although the particular embodiment of shifter mechanism 10 as described herein is preferred for the practice of this invention, multiple alternative mechanisms are envisioned in which the torque limiting device as claimed hereinbelow may be utilized.

What is claimed is:

1. In a speed change mechanism actuable by a travelling nut on an axially extending rotatable screw shaft within a housing; an improvement comprising torque limiting means for reduction of impact loads on said shaft created by stoppage of said nut at each end of said shaft including (1) at least one friction disc rotatable relative to said housing, rotatably fixed, with respect to said nut, and axially slidable over said nut, (2) at least one torque reaction member axially slidable with respect to said housing but rotatably fixed relative thereto, and (3) means for urging said friction disc against said torque reaction member wherein said torque limiting means comprises a first group of two friction discs and an associated torque reaction member interjacent said discs, said first group being at one end of said shaft, said torque limiting means further comprising a second group of friction discs and an associated torque reaction member at the other end, wherein said spring is positioned axially intermediate said first and second groups of associated friction discs and reaction members.

2. The speed change mechanism of claim 1 wherein said spring is under a constant compression force regardless of nut position along said shaft, whereby said groups are urged apart.

3. The speed change mechanism of claim 2 wherein said compression force generates a friction force between said associated friction discs and reaction members of each group, said friction forces totaling a magnitude greater than that generated between the nut and screw shaft but less than the impact force generated by said striking contact between said impact member and shifter nut stop.

4. The speed change mechanism of claim 3 further comprising retension means for said groups and said spring interjacent said groups, wherein said spring bears against each group urging same against retension means.

5. The speed change mechanism of claim 4 wherein said nut comprises a cylindrical external surface having an axially extending flat portion thereon.

6. The speed change mechanism of claim 5 wherein said friction discs are defined by annular rings having internal diameters greater than the external diameter of said nut, each of said rings having a flat portion interrupting a part of said internal diameter, said portion corresponding to and fitting over and adjacent said flat portion of said nut.

7. The speed change mechanism of claim 6 wherein said reaction members are defined by annular rings having internal diameters smaller than the external diameters of said friction discs, and said reaction members having at least one tang radially extending from the external periphery thereof.

8. The speed change mechanism of claim 7 wherein said shifter slide comprises an internal cylindrical surface having a diameter greater than the diameters of said reaction members, said surface defining at least one keyway extending axially therein, said keyway providing means for axially sliding contact with said tang.

9. The speed change mechanism of claim 8 including means for preloading said shifter slide, to enable said slide to move toward either of said end positions of said nut on said shaft.

10. The speed change mechanism of claim 9 wherein said screw shaft comprises at least one bushing fixed thereto, said bushing comprising a raised annulus portion thereabout.

* * * * *